March 26, 1940.    G. R. BOTT    2,195,163
METHOD OF MAKING PARTS OF SAFETY RAZORS OF THE VIBRATORY TYPE
Original Filed March 6, 1937    2 Sheets-Sheet 1

INVENTOR.
George R. Bott
BY C. P. Goepel
his ATTORNEY.

March 26, 1940.    G. R. BOTT    2,195,163
METHOD OF MAKING PARTS OF SAFETY RAZORS OF THE VIBRATORY TYPE
Original Filed March 6, 1937   2 Sheets-Sheet 2
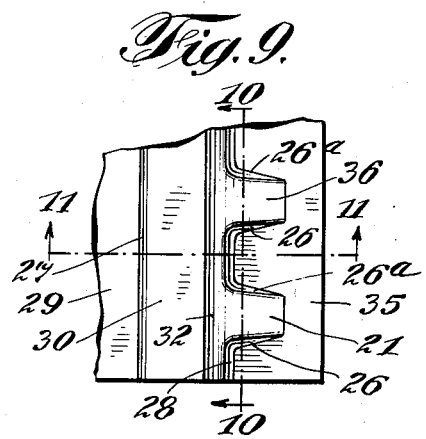
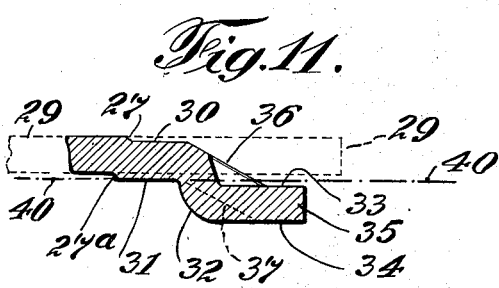
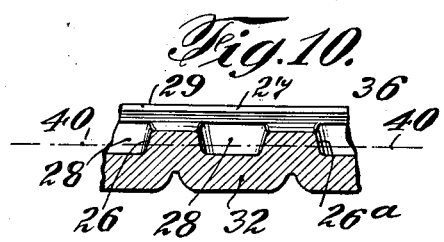
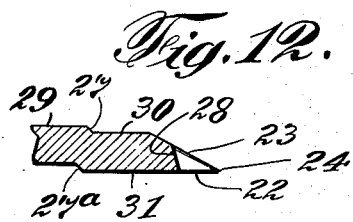
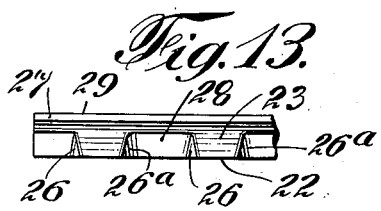
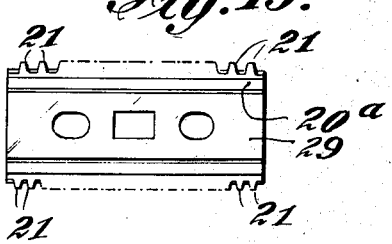
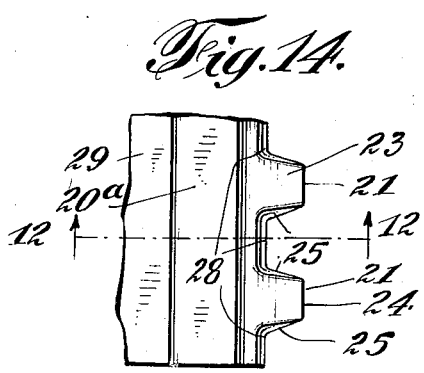
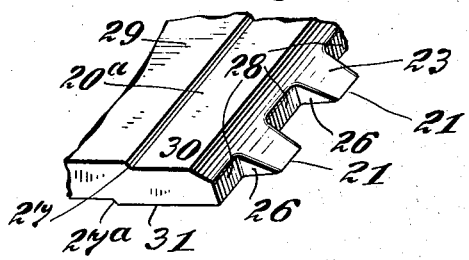
INVENTOR.
George R. Bott
his ATTORNEY.

Patented Mar. 26, 1940

2,195,163

UNITED STATES PATENT OFFICE 2,195,163

METHOD OF MAKING PARTS OF SAFETY RAZORS OF THE VIBRATORY TYPE

George R. Bott, Stamford, Conn.; The Stamford Trust Company, executor of said George R. Bott, deceased Application March 6, 1937, Serial No. 129,451
Renewed November 18, 1939

1 Claim. (Cl. 76—104)

This invention relates to razors, and more particularly to razors of the kind in which a moving cutter member contacts directly with the skin of the user, which movable cutter member has cutting edges spaced from the skin combined with a second stationary cutter member having cutting edges, the cutting edges of both cutter members being arranged on teeth, as more particularly described and shown in my co-pending application Serial No. 90,060, filed July 11, 1936.

The object of this invention is to provide a novel method of manufacturing the cutting members, and this method consists in subjecting a blank or plate to a stamping action whereby the configuration of the final product is delineated, and then subjecting the stamped blank or plate to a grinding or cutting action to remove therefrom extraneous parts, as a result of which the final member is produced which has the sharp cutting edges ready for use.

The invention consists also of a new article of manufacture in which teeth are so shaped as to present to the hair to be cut, an acute angle.

The invention herein is applicable in regards to shape both to circularly shaped razor cutters, an embodiment of which is shown in the aforesaid application, and to rectangularly shaped safety razors of the general standard type now on the market.

The invention will be more fully described hereinafter, embodiments thereof shown in the drawings, and the invention will be finally pointed out in the appended claim.

In the drawings, wherein like symbols refer to like or corresponding parts throughout the several views—

Fig. 9 is a partial plan view of a cutting member of a straight side razor;

Fig. 10 is a section taken on line 10—10 of Fig. 9;

Fig. 11 is a radial section of Fig. 9, taken on line 11—11 of Fig. 9;

Fig. 12 is a similar radial section of the completed cutting member taken on line 12—12 of Fig. 14;

Fig. 13 is a front view of the same;

Fig. 14 is a plan view of the same;

Fig. 15 is a plan view of a straight side cutting member; and

Fig. 16 is a perspective view of a number of teeth of the same.

Figure 1:
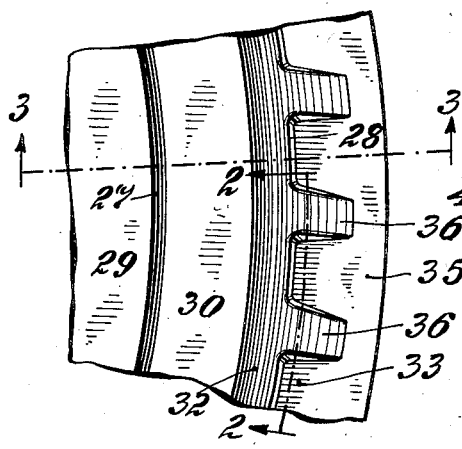
Figure 1 is a partial plan view of the top cutting member of a circular razor.
Figure 2:
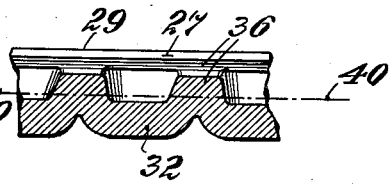
Figure 2 is a section taken on line 2—2 of Fig. 1.

Referring to the drawings, the completed cutting member of circular shape, in whole or in part, is shown in Figs. 4 to 8, and of straight sides is shown in Figs. 13 to 16.

In each case, the cutter member 20 is provided with a plurality of spaced teeth 21. These teeth in the embodiments shown, have each four sides, one side 22 in a plane at right angles to the plane of rotation in the case of Figs. 4 to 8, and at right angles to the axis of the motor used but not shown, for vibrating the cutting member in the case of Figs. 12 to 16.

Figure 7:
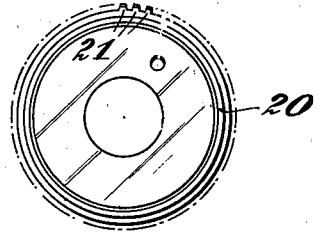
Fig. 7 is a plan view, shown in part, of a cutting member.
Figure 5:
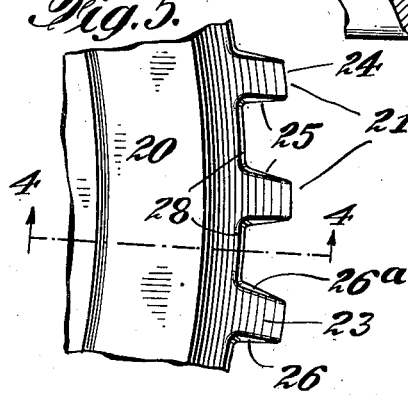
Fig. 5 is a partial plan view of the completed member.

Another side 23 is formed by a conoid having its apex in the axis of rotation of the member 20 shown in Fig. 7, and is formed by an inclined plane at an acute angle to the axis of the motor drive of the form shown in Fig. 15. In fact, in Fig. 15, two planes form this side of the teeth on both sides of the vibrating plate 20a.

Thereby, the sides 22 and 23 are inclined to each other and merge into a sharp line of merger, in the case of Figs. 4 to 8, along a circular line, and in the case of Figs. 12 to 16, in a straight line 24.

The two remaining sides 26 and 26a of each tooth are formed by planes each inclined to the base side 22, and the lines of merger form the cutting edges 25. These lines of merger are the intersection lines of two planes passing through the respective sides.

Finally, the spaces between the teeth have an inclined sidewall 28 between the teeth, forming the peripheral portion of the body member and the dedendum of the teeth.

Each of the teeth 21 has two cutting edges 25 so as to be able to cut when the rotation or reciprocation is in either direction, or in only one direction. These cutting edges cooperate with cutting edges of a bottom member, not herein shown, but one form is shown in my co-pending application, Serial No. 90,060, filed July 11, 1936, and another form is shown in my application filed on even date herewith, Serial No. 129,453 dated March 6, 1937. An application for an invention consisting of a composite blade was also filed of even date herewith under Serial No. 129,452. Or, two cutting members, such as shown in either Figs. 7 or 15, can have their base sides brought face to face. In each case, the cutting edges will, during cutting, be inclined to each other and subject the hair to a shearing cut. It will be particularly noted that the cutting edge is formed by planes at an acute angle to each other, and the plane of the base side is in each case substantially at right angles to the axis of the hair being cut. The top side is non-cutting or non-abrading and is the side which contacts with the skin.

Figures 8, 8A:
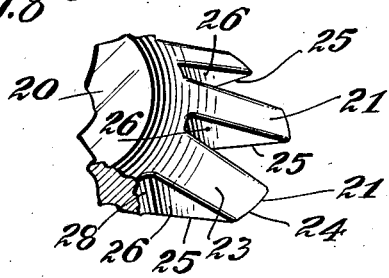
Fig. 8 is a perspective view of several of the cutting teeth.
Fig. 8a is a section of a bottom member showing the method as applicable thereto.

Thus from the description, it has been seen that the base side is the largest side, and from this there extends the two lateral sides 25 and 26 in planes which would intersect at some point above the top side, and that the top side itself is inclined at an acute angle to the base side, the intersection line of the two planes forming the extreme peripheral portion of the cutting member. In the case of Fig. 8, the plane passing through the top side is conoidal, and in the case of Fig. 16, it is a flat plane. This intersection line or merger line is curved in the case of Fig. 8, and straight in the case of Fig. 16.

The method of making the cutting members described is to begin with a flat, blank plate of substantially uniform thickness and of suitable metal. For a member like that shown in Fig. 7, a circular plate is used. For a member like that shown in Fig. 15, a rectangular plate is used.

Figure 3:
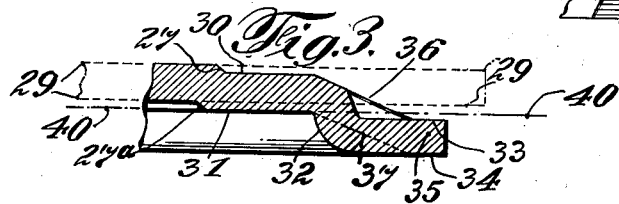
Fig. 3 is a radial section taken on line 3—3 of Fig. 1.
Figure 6:
Fig. 6 is a front view of Fig. 5.
Figure 4:
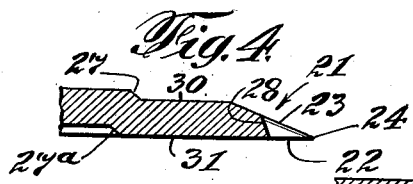
Fig. 4 is a similar section of the completed cutting member, taken on line 4—4 of Fig. 5.

The plate is then subjected to a stamping action and is given a configuration such as shown in Fig. 3 and in Fig. 11. The thickness of the original disc or plate is shown in Figs. 3 and 11 by the dotted parallel lines and the space between indicated by 29. The stamping action provides shoulders 27 and 28, then transposes the two parallel sides 30 and 31 downwardly, then forms a bent portion 32, and finally again transposes the two parallel sides 33 and 34, to form an external band 35. This bent or beaded portion is formed between the teeth. For stamping the teeth at the same time, the dies are provided with parallel inclined surfaces to form the parallel transposed surfaces 36 and 37. The structure as it comes from the stamping dies looks, in plan, like Fig. 1 or Fig. 9. Any number of blanks from suitable dies to shape these structures like Fig. 1 or Fig. 9 can be made at an extremely small cost. All that is now necessary is to subject each stamped blank, or a series of blanks, to a grinding action whereby the outer band itself, provided with serrations, is removed. The grinding action is limited to the grinding line, as shown on line 40—40, Figs. 2, 3, 10, and 11, whereby the part 35 is removed and the cutting edges of the teeth are thereby formed and sharpened.

In Fig. 8a is shown a part of a stationary or bottom cutter member, stamped from a top plate or disc, and subjected to a grinding action on line 40—40, whereby the part 50 below the line is removed and the portion 50 with the tooth 51 and comb 52 remains. While the top member has its teeth inclined at its sides as at 26, the teeth of the comb 52 are not inclined but perpendicular to the bottom side 53.

Thus, by a simple stamping action upon a blank, and subjecting the stamped blank to a simple grinding operation, the cutting members may be made by mass production. The lower cutter members may be made in the same way.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations, modifications, and adaptations as come within the scope of the appended claim.

I claim:

The method of making razor members with teeth, which consists in subjecting a piece of sheet metal having its upper and lower surfaces parallel with each other to stamping and coining to shape the teeth, the web of the sheet metal around said coined teeth being pressed beyond the plane passing through the lower surface of the sheet metal so that the upper surface of such surrounding web material is below the lower surface of the sheet metal, and removing the surrounding web material by separating the same in a plane passing through said lower surface of the sheet metal, whereby the teeth with sharpened cutting edges remain.

GEORGE R. BOTT.